United States Patent
McClintock et al.

(10) Patent No.: US 9,992,083 B1
(45) Date of Patent: Jun. 5, 2018

(54) SYSTEM TO DETECT NETWORK EGRESS POINTS

(71) Applicant: AMAZON TECHNOLOGIES, INC., Seattle, WA (US)

(72) Inventors: Jon Arron McClintock, Seattle, WA (US); David John Burke, Dublin (IE); Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 14/862,068

(22) Filed: Sep. 22, 2015

(51) Int. Cl.
*G06F 15/16* (2006.01)
*H04L 12/26* (2006.01)
*H04L 29/06* (2006.01)

(52) U.S. Cl.
CPC ........ *H04L 43/065* (2013.01); *H04L 63/0209* (2013.01); *H04L 69/16* (2013.01)

(58) Field of Classification Search
CPC .... H04L 43/065; H04L 63/0209; H04L 69/16
USPC ........................................................ 709/224
See application file for complete search history.

(56) References Cited

U.S. PATENT DOCUMENTS

| 5,675,741 A * | 10/1997 | Aggarwal | H04L 45/04 709/224 |
| 7,668,164 B2 * | 2/2010 | Jonsson | H04L 45/04 370/392 |
| 2005/0050316 A1* | 3/2005 | Peles | H04L 63/166 713/151 |
| 2014/0283029 A1* | 9/2014 | Chandrasekaran | H04L 63/14 726/22 |
| 2016/0173357 A1* | 6/2016 | Stokking | H04L 41/04 370/252 |

OTHER PUBLICATIONS

Microsoft Computer Dictionary, Fifth Edition, pp. 362 and 502.*

* cited by examiner

*Primary Examiner* — Oleg Survillo
*Assistant Examiner* — Tan Doan
(74) *Attorney, Agent, or Firm* — Lindauer Law, PLLC (57) ABSTRACT

Described are techniques for detecting network egress points. A source device on a first network may generate a probe data with loose source route data that includes internal routing data to a designated subnet within the first network. The ultimate destination of the probe data is outside the first network. Once at the designated subnet, the probe data is handled by the egress network devices, such as a router, that services the subnet. Ultimately, the probe data may arrive at a destination device by way of a second network. The destination device determines the egress point from the first network used by the probe data. By comparing the actual route data with known egress points, known egress network devices may be confirmed and unknown egress network devices may be determined.

20 Claims, 8 Drawing Sheets

SYSTEM TO DETECT NETWORK EGRESS POINTS

BACKGROUND

Data networks provide a way for a wide variety of devices to communicate with one another. Connections between networks allow data to pass from one network to another. Knowledge about these connections may be desirable.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Data networks (networks) allow data traffic (traffic) to move between devices. An individual network may be divided into one or more subnetworks (subnets). The subnets may correspond to different geographical limitations, organization groups, and so forth. For example, a company having a corporate network may subdivide that network such that branch offices are subnets of the corporate network. Subnets may be joined together using various techniques such as leased lines, virtual private networks (VPN), and so forth. Continuing the example, the corporate network may use VPNs that carry traffic across another network, such as the Internet, to form the corporate network. In some situations, the subnets may be used to segregate organization units, business groups, and so forth. For example, devices that are associated with a marketing department may use a first subnet while devices associated with a finance department may use a second subnet, even though all devices are in the same facility.

Network devices, such as routers, may be used to direct the movement of data from one network to another, between subnets of the same network, and so forth. An egress network device is a network device that transfers data from one network to another. For example, an egress network device may be a gateway router that passes traffic between the corporate network and the Internet.

Best practices with regard to network operation, administration, security, and so forth, recommend awareness of the egress network devices on that network. An unknown egress network device may result in service problems, provide an avenue for possible attack, data exfiltration, and so forth. By analogy, if the egress network devices are the "doors" to the network, an unknown egress network device provides a "door" that may allow an intruder to enter or data to leave unbeknownst to the operator of the network.

In organizations that have extensive networks, it is possible for unknown egress network devices to be installed within those networks without the knowledge of an overall system administrator. For example, a branch office may add another router to provide additional connectivity to the Internet. Users may inadvertently introduce egress network devices into an existing network. For example, a wireless device such as a smartphone or tablet with connectivity to the second network may act as a personal hotspot and subsequently provide a pathway for data to leave the first network that is independent of the established egress network devices. Attackers may install illicit egress network devices in an attempt to gather information about the network, subvert operation of the network, and so forth. In some situations, an unknown egress device may result in uncontrolled data exfiltration that may then be used by an attacker.

Loose source routing is a technique in which a portion of a route for data to follow when transiting a network is specified. For example, loose source routing may include a particular ordering of a first router and second router that a particular datagram is supposed to follow when transmitted on the network.

Described in this disclosure are techniques to determine the presence of unknown egress network devices using loose source routing, assess operation of known egress network devices, and so forth. In one implementation, a source device that is connected to a first subnet of the first network may generate probe data that includes loose source route data and a destination address. The loose source route data may direct one or more datagrams associated with the probe data to be forwarded from the first subnet to a second subnet that is also on the first network. At the second subnet, the probe data is then processed and directed to the destination address by an egress network device that is coupled to a second network. The probe data may transit the second network and ultimately arrive at the destination device.

During the transit of the second network, additional information may become associated with the probe data. For example, the egress network device may have added data indicative of an actual egress network address, such as a source Internet protocol (IP) address, to the datagram during processing and forwarding. During this time, if the first subnet was otherwise able to access the second network, the first subnet remains able to access the second network. The loose source route data may thus direct the probe data to take a route to the destination device that is otherwise longer than a most direct path available. The length of a route may be determined by counting a number hops or network devices involved in reaching a destination.

The destination device may analyze the probe data and the actual egress network address to determine at least part of the route that was taken by the probe data to reach the destination device. The destination device may access network map data, such as a list of egress network devices known to exist on the first network. The network map data may be searched to see if the actual egress network address that accompanied the probe data is present within the destination network map data. When the actual egress network address is found within the network map data, report data may be generated indicating that a known egress network device was used. When the actual egress network address is not found within the network map data, the report data may be generated that indicates an unknown egress network device has been identified. Subsequent actions may be taken to assess the unknown egress network device. For example, the unknown egress network device may be added to the network map data following inspection by system administrator.

The probe data sent by the source device may include many different datagrams sent at different times, using different ports, and so forth. The source device may send the probe data to different subnets within the network. For example, the source device may send 1000 datagrams of probe data, with different datagrams having loose source route data directing them to different subnets, to use different ports, and so forth.

Operation of the known egress network devices may also be tested by the probe data. Notification data may be sent from the source device to the destination device indicating that particular probe data was sent as well as information about the probe data, such as a unique identifier. The notification data may be compared to log data obtained from the known egress network devices to determine if the probe data was processed using a known egress network device. For example, the log data may be searched for the unique identifier. If the unique identifier is not found in the log data, it may be indicative of the probe data being processed by an egress network device that either did not provide log data or a failure. Similarly, presence of the unique identifier in the log data may indicate that the egress router is known and that the logging functionality of the egress network device is working properly.

In some implementations, the actual egress network address associated with the probe data may be analyzed with respect to the network map data to determine the use of unexpected traffic routes. For example, the probe data may be sent to the second subnet with its own router, and yet the actual egress network address may indicate a router on the first subnet. A determination of this difference, in particular that the router on the first subnet was used instead of the router on the second subnet, may generate an alert to review routing policies within the first network.

By using the techniques described herein, previously unknown, overlooked, or forgotten network devices may be determined. As a result, security of the network and the data traffic transiting a network may be improved. For example, an unauthorized router that connects a corporate network to the Internet may be detected and subsequently secured. The system may operate in a distributed fashion, with individual hosts intercommunicating with one another, may utilize a centralized server, or may employ a combination of distributed and centralized topography.

Illustrative Systems

Figure 1:
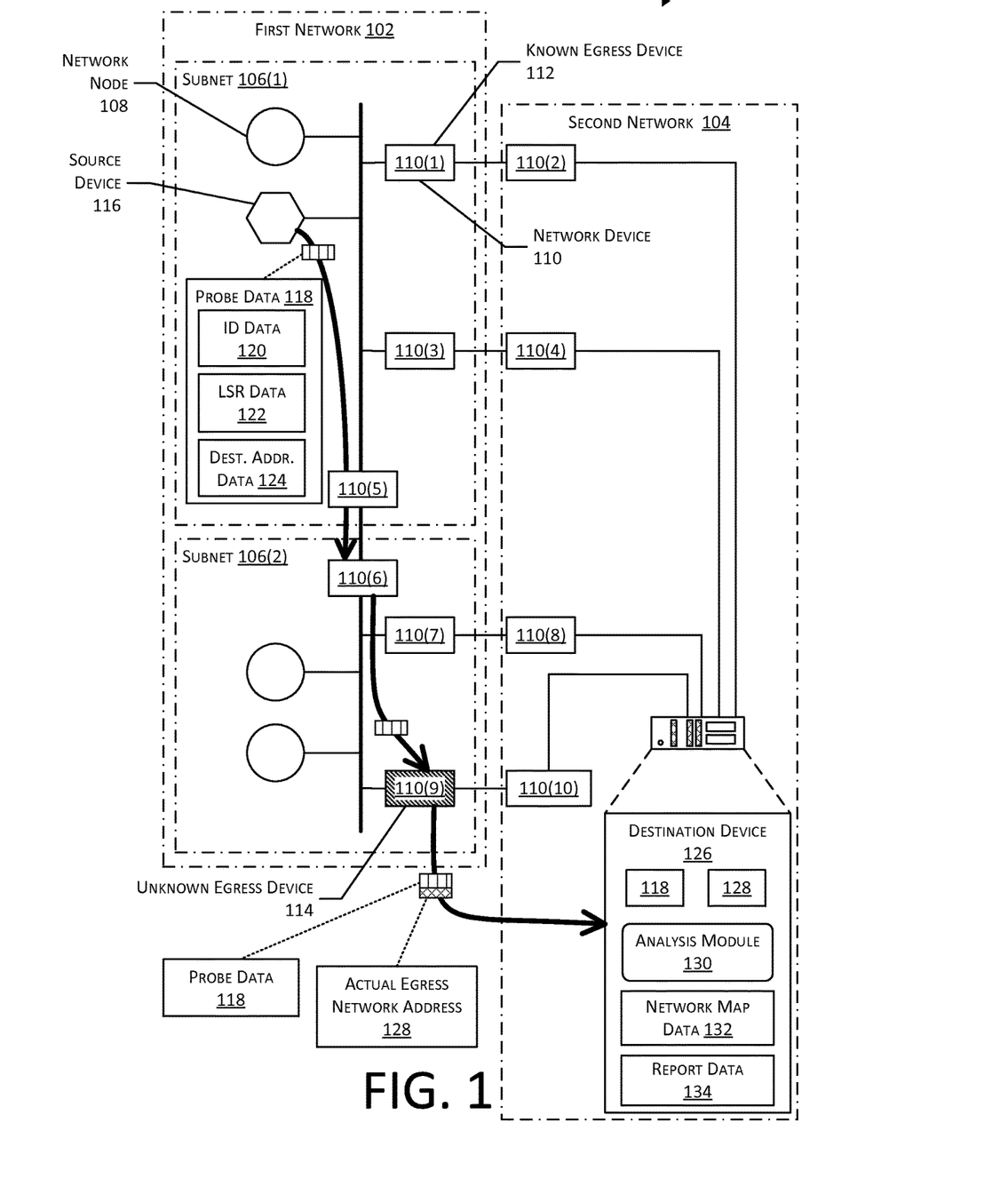
FIG. 1 depicts a system for determining egress network devices of a network using loose source routing, according to one implementation.

FIG. 1 depicts a system 100 for determining egress network devices of a network using loose source routing, according to one implementation. A first network 102 is connected to a second network 104 such that data traffic (traffic) may move between the two. In some implementations, the traffic may flow unidirectionally, such as from the first network 102 to the second network 104 or vice versa. In other implementations, the traffic may flow bidirectionally.

The networks may transfer traffic using one or more different protocols. For example, the networks may implement data link layer protocol such as IEEE 802.2 as promulgated by the Institute of Electrical and Electronics Engineers (IEEE) or Point to Point Protocol (PPP), use a network layer protocol such as Internet Protocol version 4 (IPv4), Internet Protocol version 6 (IPv6), and so forth. The first network 102 and the second network 104 may utilize the same or different protocols.

The networks may be subdivided or otherwise arranged into subnetworks 106 (subnets). The subnets 106 may be used to partition a network based on one or more of geographic location, organizational unit function, security level, administrative convenience, network performance reasons, and so forth.

One or more network nodes 108 may be connected to the subnet 106. The network nodes 108 may comprise one or more of servers, workstations, mobile devices, televisions, printers, scanners, building automation devices, and so forth.

By way of illustration, and not necessarily as limitation, the first network 102 is subdivided into a first subnet 106(1) and a second subnet 106(2). Traffic may be exchanged between the first subnet 106(1) and the second subnet 106(2) using a network device 110.

The network device 110 may be configured to transfer traffic between different network nodes 108, different subnets 106, or different networks. The network device 110 may be able to affect some control or implement one or more rules in handling the transfer. For example, the network device 110 may be configured to selectively transfer data, such as distributing transferring data in accordance with one or more routing rules.

The network device 110 may comprise a router, a media access control (MAC) bridge, proxy server, load balancing device, firewall device, virtual private network (VPN) device, and so forth. The network device 110 may also include one or more of a processor, computer readable storage media, one or more network interfaces, and so forth. The network interface provides connectivity between the network device 110 and the physical layer of the network. For example, the network interface may include a transceiver, a physical connector, and so forth. In some implementations, the network device 110 may have at least one network interface coupled to a particular subnetwork or network. For example, a first interface of a router may be connected to a subnet of a corporate network while a second interface of the same router may be connected to the Internet.

In this illustration, the first subnet 106(1) includes network devices 110(1), 110(3), and 110(5). The second subnet 106(2) includes network devices 110(6), 110(7), and 110(9). The network device 110(1) connects to another network device 110(2) that is part of the second network 104. A network device 110 that connects the first network 102 to the second network 104 may be known as an egress network device. A known egress network device 112 is a network device 110 that interconnects at least two networks and for which information about the network device 110 is accessible to system administrators or other responsible authority. In comparison, a network device 110 that interconnects at least two networks but for which no information is accessible may be deemed an unknown egress network device 114.

In this illustration, the network device 110(1) is a known egress network device 112, in that a system administrator or responsible party otherwise has knowledge thereof. In comparison, the network device 110(9) connects to the network device 110(10), providing a connection between the second subnet 106(2) and the second network 104. The network device 110(9) may be unknown to a responsible authority, or the configuration of the network device 110(9) that establishes the connection to the network device 110(10) may be unknown to the responsible authority. As a result, the network device 110(9) is deemed an unknown egress network device 114. For example, the unknown egress network device 114 may comprise a router that has been installed without authorization by the responsible authority for the first network 102. In another example, the unknown egress network device 114 may comprise a router that is known and authorized by the responsible authority, but for which an unauthorized configuration change results in the connection to the second network 104.

A source device 116 may be connected to the first network 102. The source device 116 may comprise a server or network device 110. The source device 116 is configured to generate probe data 118. The probe data 118 may include one or more of identification (ID) data 120, loose source route (LSR) data 122, or destination address data 124. The probe data 118 may comprise one or more datagrams, packets, messages, frames, cells, and so forth, that comprise data structured for transmission along one or more networks. In one implementation, the probe data 118 may comprise one or more of a User Datagram Protocol (UDP) datagram, a Transmission Control Protocol (TCP) packet, and so forth.

In some implementations, the probe data 118 may be formatted, transmitted, or otherwise configured to appear as though it is data associated with another service. For example, the probe data 118 may be formatted and transmitted as a datagram or packet appearing to be one or more of a Secure Socket Layer (SSL), transport layer security (TLS), hypertext transport protocol (HTTP), HTTP secured (HTTPS), and so forth.

The ID data 120 may comprise a global unique identifier (GUID), serial number, or other information that may be used to designate a particular datagram, group of datagrams, and so forth. For example, the probe data 118 may comprise many datagrams, with each datagram having a different GUID to a particular datagram to be identified relative to the other datagrams in the group. The GUID or other identifier may be generated using one or more of a random number generator or pseudorandom number generator.

In some implementations, the ID data 120 may include or be representative of information such as an identifier indicative of the source device 116, subnet 106 that was the target of the probe data 118, date, time, test number, and so forth.

The LSR data 122 comprises a partial listing of the network devices 110 through which the probe data 118 is to transit to reach the destination device. For example, the LSR data 122 may indicate that a datagram of the probe data 118 is to pass to the network device 110(5) and then on to network device 110(6). The LSR data 122 is "loose" in the sense that it does not define a complete path from the source device 116 to the destination address. In one implementation, the LSR data 122 may specify network devices 110 that the probe data 118 must visit during transit to the destination device.

The destination address data 124 specifies a network address associated with a destination device 126. The destination device 126 may be external to the first network 102. For example, the destination address data 124 may comprise an Internet protocol (IP) address of the destination device 126 that is located on the second network 104.

The LSR data 122 specifies a route from the source device 116 to the destination device 126 that is otherwise longer than would otherwise be possible. For example, during testing there may be no known failure conditions, such as a service outage of the network device 110(1) or 110(3). Without the LSR data 122, traffic from the source device 116 would otherwise follow a shorter or more direct route to the destination device 126. The length of a route may be determined by utilizing one or more network metrics, such as a count a number hops or network devices involved in reaching a destination, a time-to-live (TTL) metric, delay or latency of delivery, and so forth.

The system 100 may use the source device 116 and the destination device 126 to explore subnets 106 on the first network 102 and attempt to discover unknown egress network devices 114. For example, the source device 116 may generate probe data 118 with LSR data 122 that specifies a route including network device 110(5) and then network device 110(6). The probe data 118 originates from the source device 116 on the first subnet 106(1), and per the route specified by the LSR data 122, is transferred to the network device 110(6) that is on the second subnet 106(2). At this point, the LSR data 122 contains no further routing information, and so the network devices 110 on the second subnet 106(2) process the probe data 118 using the destination address data 124. Because the destination address data 124 is for an address on the second network 104 that is outside of the second subnet 106(2), the probe data 118 is passed to the network device 110(9) that connects to the second network 104. For example, the network device 110(9) may be spoofing the address of the network device 110(7). As illustrated here, the probe data 118 is passed to the network device 110(9). The network device 110(9), after processing the destination address data 124, passes the probe data 118 along to a network device 110(10) on the second network 104.

During the transfer from the first network 102 to the second network 104, one or more of the network devices 110 involved in that connection may affix information indicative of an actual egress network address 128. For example, a datagram header of the probe data 118 may be updated at the network device 110(9) to include as a source address a "public" IP address of the network interface of the router that communicates with the second network 104.

The probe data 118 and associated actual egress network address 128 may pass through at least a portion of the second network 104 and may ultimately arrive at the destination device 126. As described above, in some implementations, the second network 104 may itself comprise a plurality of other networks. For example, the second network 104 may comprise the Internet.

The source device 116 may be configured to send probe data 118 comprising a plurality of different packets, datagrams, or other data transfer units to one or more different subnets 106 of the first network 102. The selection of a particular subnet 106 or the network device 110 within that subnet 106 that is to be included in the LSR data 122 may be made in several ways. In one implementation, the selection may be random or pseudorandom. In other implementations, the selection may be based on a predefined sequence, upon demand, responsive to information indicative of trouble within at least a portion of the first network 102, and so forth.

One or more of the different packets, datagrams, or other data transfer units may be addressed using different network ports. For example, the source device 116 may generate probe data 118 that are transmitted using particular IP ports, randomly selected IP ports, and so forth. In one implementation, open network ports that are previously known or assumed to allow the transfer of traffic may be specified in use to send probe data 118. In another implementation, closed network ports that are previously known or assumed to block or disallow the transfer of traffic may be used to send probe data 118. Should the destination device 126 fail to receive probe data 118 sent using the open network ports, trouble with the first network 102 may be determined. Similarly, should the destination device 126 receive probe data 118 that was sent using close network ports, trouble with the first network 102 may be determined. For example, the firewall policy may be improperly configured which allows data transfer using what should otherwise be a close network port.

The destination device 126 receives the probe data 118 and data indicative of the actual egress network address 128 that accompanies the probe data 118. An analysis module 130 may access one or more of the probe data 118, the actual egress network address 128, network map data 132, notification data, or other information to generate report data 134 or take other actions.

The network map data 132 comprises information about the network devices 110 on the first network 102. For example, the network map data 132 may comprise a list of the IP addresses of the network interfaces that connect the first network 102 to the second network 104.

The analysis module 130 may be configured to compare the actual egress network address 128 with the network map data 132 and generate comparison data. For example, the comparison data may indicate that the actual egress network address 128 associated with the probe data 118 is not listed in the network map data 132 for the first network 102. The analysis module 130, based on the comparison data, may generate report data 134. For example, the report data 134 may indicate that the actual egress network address 128 is unknown, thus indicating an unknown egress network device 114. A responsible party, automated process, or combination thereof may use the report data 134 to take action. For example, an Internet service provider may be contacted, and traffic to and from the actual egress network address 128 may be traced to a particular physical connection for further investigation.

The LSR data 122 facilitates the distribution of the probe data 118 to various subnets 106 within the first network 102. As a result, the relatively small number of source devices 116 may be used to test a relatively large first network 102. For example, a small fleet of source devices 116 may be used to test for unknown egress network devices 114 across thousands of subnets 106 of the first network 102. Furthermore, the LSR data 122 may allow the testing of particular network devices 110 within the first network 102. For example, the LSR data 122 may be configured specifically to route traffic to the network device 110(7) to test that device's handling of the probe data 118.

By using the techniques and systems described above, operation of one or more of the first network 102, the second network 104, the network nodes 108, the network devices 110, and so forth, may be improved. For example, network devices 110 that have incorrect routing tables may be identified, unknown egress network devices 114 may be detected for subsequent remediation, and so forth. This may reduce routing errors, minimize loss of information, improve network security, and so forth. The system 100, thus, allows for a relatively low cost and efficient mechanism for ongoing testing of complex networks.

Figure 2:
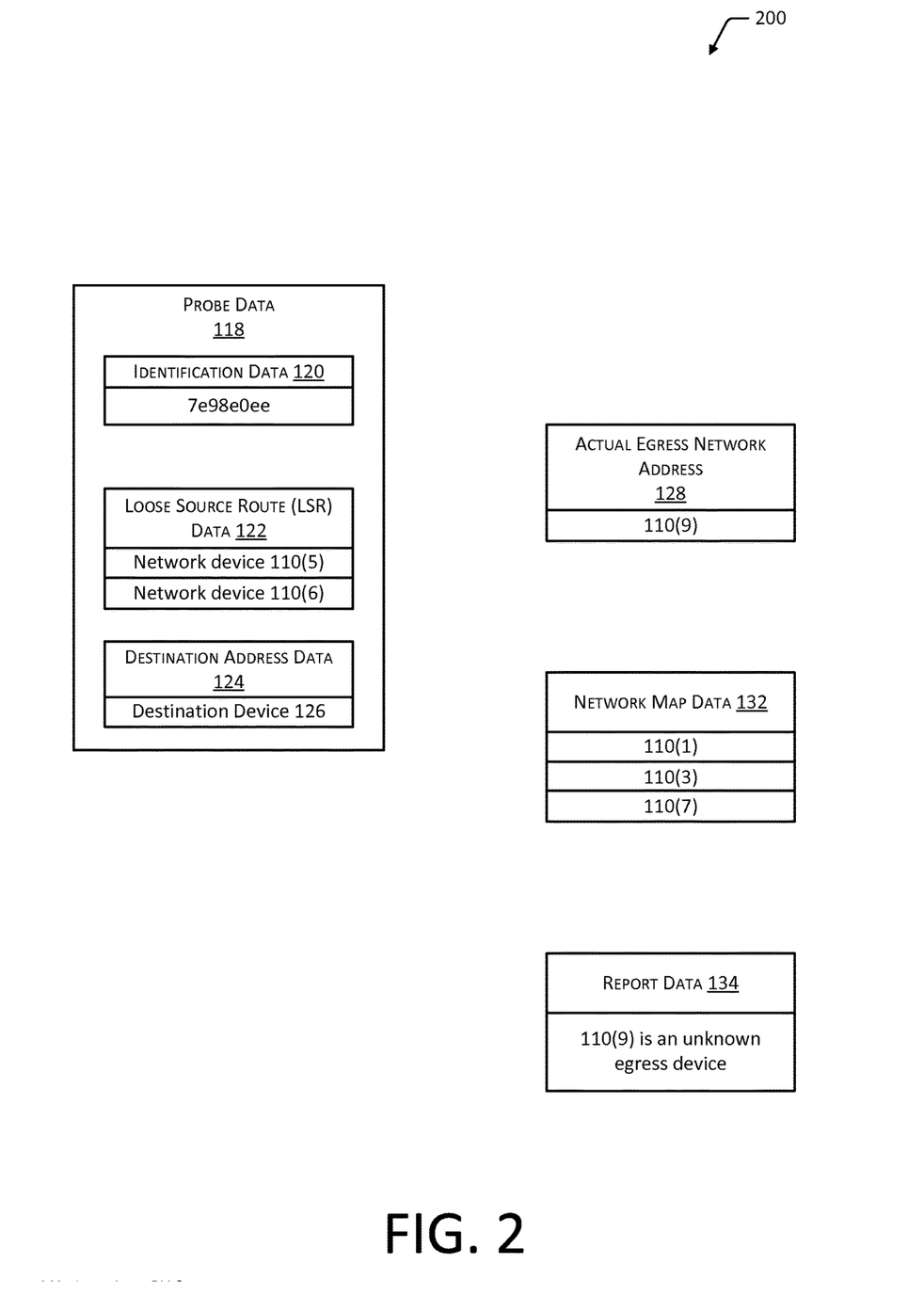
FIG. 2 depicts an overview of block diagrams of various data used to determine egress network devices of a network, according to one implementation.

FIG. 2 depicts an overview 200 of block diagrams of various data used to determine egress network devices of a network, according to one implementation. As described above, the probe data 118 may include one or more of ID data 120, LSR data 122, or destination address data 124. In the example depicted, the probe data 118 includes ID data 120 having a value of "7e98e0ee", LSR data 122 that designates a path of the probe data 118 to network device 110(5) followed by network device 110(6), and destination address data 124 indicative of the network address for the destination device 126.

Continuing the example depicted, the actual egress network address 128 indicates the network address associated with the network device 110(9). For example, the actual egress network address 128 may comprise an Internet Protocol address on the second network 104 of an external interface of a router that connects the first network 102 and the second network 104. As described above, the network device 110(9) transferred the probe data 118 from the second subnet 106(2) of the first network 102 to the second network 104.

The network map data 132, in this example, includes a list of network devices 110(1), 110(3), and 110(7), indicative of the known egress network devices 112 associated with the first network 102. In some implementations, the network map data 132 may include internal network devices 110 that are responsible for transferring traffic between subnets 106. For example, the network map data 132 may include the network devices 110(5) and 110(6), which connect the first subnet 106(1) to the second subnet 106(2), but themselves are not connected directly to the second network 104.

As described above, the analysis module 130 may generate report data 134. In this example, the report data 134 indicates that the network device 110(9) is an unknown egress network device 114 because network device 110(9) is not in the network map data 132.

Figure 3:
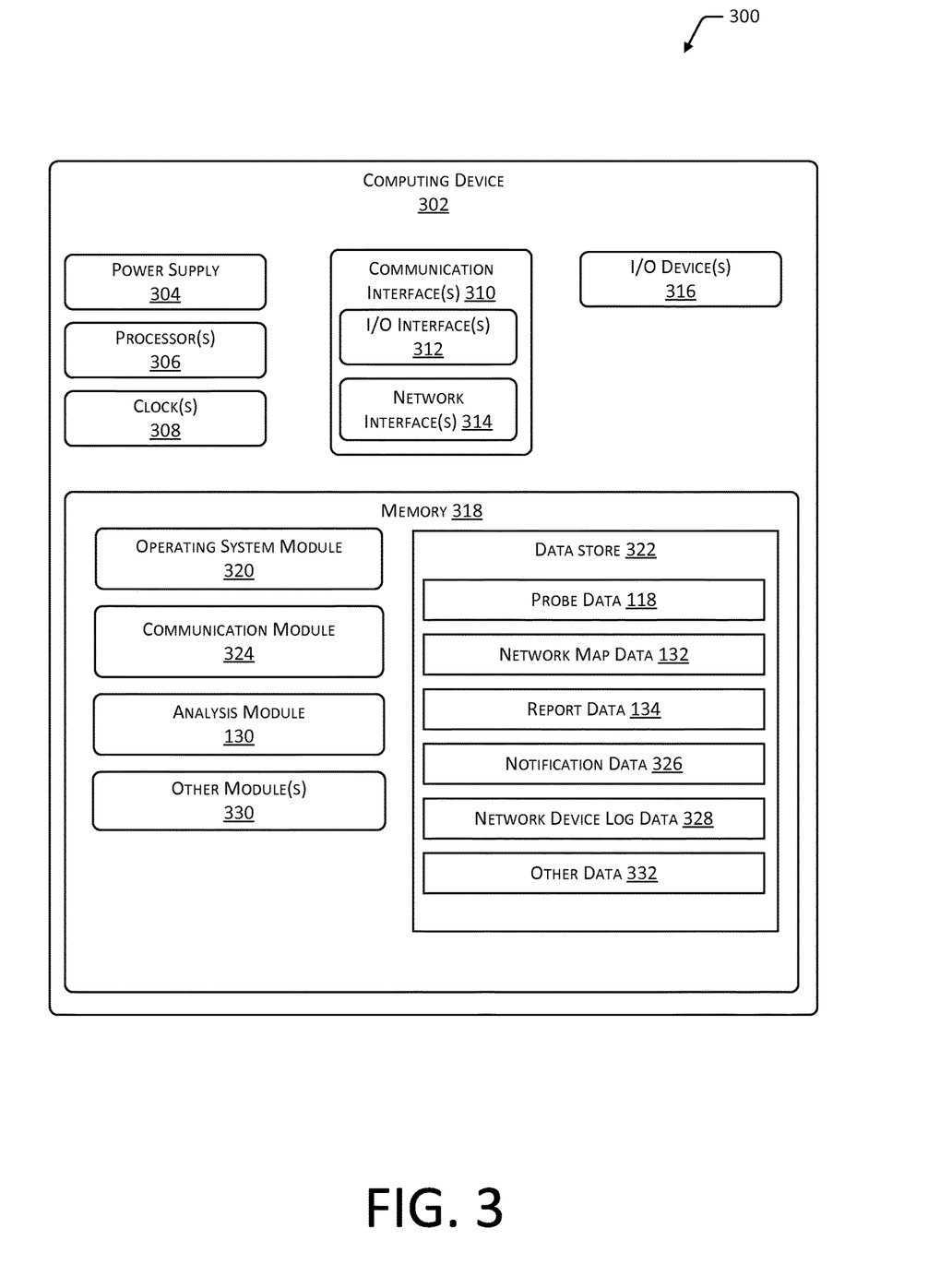
FIG. 3 is a block diagram of a computing device within the scope of the present disclosure, according to one implementation.

FIG. 3 is a block diagram 300 of a computing device 302 within the scope of the present disclosure, according to one implementation. One or more of the network node 108, the network device 110, the source device 116, or the destination device 126 may comprise a computing device 302. Any type of computing device 302 and any number of networked computing devices 302 may perform the implementations described herein individually or in coordination with one another.

One or more power supplies 304 may be configured to provide electrical power suitable for operating the components of the computing device 302. In some implementations, the power supply 304 may include a rechargeable battery, fuel cell, photovoltaic cell, power conditioning circuitry, and so forth.

The computing device 302 may include one or more hardware processor(s) 306 (processors) configured to execute one or more stored instructions. The processor(s) 306 may include one or more cores. One or more clocks 308 may provide information indicative of date, time, ticks, and so forth. For example, the processor(s) 306 may use data from the clock 308 to generate a timestamp, trigger a preprogrammed action, determine the time at which probe data 118 is received, and so forth.

The computing device 302 may include one or more communication interfaces 310, such as input/output (I/O) interfaces 312, network interfaces 314, and so forth. The communication interfaces 310 may enable the computing device 302, or components of the computing device 302, to communicate with other computing devices 302 or components of the other computing devices 302. The I/O interfaces 312 may include interfaces such as Inter-Integrated Circuit (I2C), Serial Peripheral Interface (SPI) bus, Universal Serial Bus (USB) as promulgated by the USB Implementers Forum, RS-232, and so forth.

The I/O interface(s) 312 may couple to one or more I/O devices 316. The I/O devices 316 may include any manner of input device or output device associated with the computing device 302. For example, I/O devices 316 may include touch sensors, keyboards, mouse devices, microphones, image sensors (e.g., cameras), scanners, displays, speakers, haptic devices, printers, and so forth. In some implementations, the I/O devices 316 may be physically incorporated with the computing device 302 or may be externally placed.

The network interfaces 314 may be configured to provide communications between the computing device 302 and other devices, such as the I/O devices 316, routers, access points, and so forth. The network interfaces 314 may include devices configured to couple to one or more networks including local area networks (LANs), wireless LANs, wide area networks (WANs), wireless WANs, and so forth. For example, the network interfaces 312 may include devices compatible with Ethernet, asynchronous transfer mode (ATM), frame relay, Wi-Fi®, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 318. The memory 318 may include one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 318 may provide storage of computer-readable instructions, data structures, program modules, and other data for the operation of the computing device 302. A few example modules are shown stored in the memory 318, although the same functionality may alternatively be implemented in hardware, firmware, or as a system on a chip (SoC).

The memory 318 may include one or more operating system (OS) modules 320. The OS module 320 may be configured to manage hardware resource devices such as the I/O interfaces 312, the network interfaces 314, the I/O devices 316, and to provide various services to applications or modules executing on the processors 306. The OS module 320 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 322 and one or more of the following modules may also be stored in the memory 318. The modules may be executed as foreground applications, background tasks, daemons, and so forth. The data store 322 may use a flat file, database, linked list, tree, executable code, script, or other data structure to store information. In some implementations, the data store 322 or a portion of the data store 322 may be distributed across one or more other devices including other computing devices 302, network attached storage devices, and so forth.

A communication module 324 may be configured to establish communications with one or more other computing devices 302, such as the network nodes 108, the network devices 110, the source devices 116, the destination device 126, and so forth. The communications may be authenticated, encrypted, and so forth. In some implementations, the communication module 324 may be used to generate the probe data 118.

The memory 318 may store the analysis module 130 that is configured to utilize information in or associated with the probe data 118 to generate report data 134. For example, the analysis module 130 may be configured to, responsive to receiving the probe data 118, process data using the processor 306 and the memory 318.

As described above, in some implementations, the analysis module 130 may compare the probe data 118, the actual egress network address data 128, or portions thereof with at least a portion of the network map data 132. For example, the analysis module 130 may determine if the value of the actual egress network address 128 corresponds to a value of a network device 110 that is designated by the network map data 132 as being part of the first network 102. Continuing the example, the analysis module 130 may also determine if the actual egress network address 128 corresponds to the network address associated with the known egress network device 112 specified by the LSR data 122 specific to the particular probe data 118.

The analysis module 130 may access notification data 326 during operation. The notification data 326 may be provided by the source device 116 or another device that controls or otherwise directs operation of the source device 116. The notification data 326 comprises information about the probe data 118 that is generated and may also include information indicative of the transmission of that probe data 118. For example, the source device 116 may generate notification data 326 indicative of the ID data 120, LSR data 122, destination address data 124, and so forth, of a particular set of probe data 118. The source device 116 may provide the notification data 326 to the destination device 126. For example, the source device 116 may send the notification data 326 to the destination device 126 separately from the probe data 118. The notification data 326, for example, may not be sent using the LSR data 122.

The analysis module 130 may use the notification data 326 to assess the first network 102, the second network 104, or both. For example, if the notification data 326 indicates that probe data 118 was sent, but no probe data 118 was received by the destination device 126, the report data 134 may indicate a fault. In another example, if the notification data 326 indicates the probe data 118 was sent to a particular subnet 106 using a particular route specified by the LSR data 122, but the actual egress network address 128 corresponds to a different subnet 106, the report data 134 may indicate a fault.

In some implementations, the analysis module 130 may access network device log data 328. The network device log data 328 may comprise information acquired from one or more of the network devices 110. For example, the network devices 110 may send the network device log data 328. The network device log data 328 may be indicative of a timestamp associated with a transfer of data by the network device 110, a source and destination address associated with the transfer, a port associated with the transfer, payload of the data transferred, and so forth.

The analysis module 130 may compare data from one or more of the probe data 118, the actual egress network address 128, the notification data 326, the network map data 132, and so forth, to generate report data 134. For example, the source device 116 may send the probe data 118. The destination device 126 may receive the probe data 118 and use information obtained from or associated with the probe data 118 to search the network device log data 328. A record of the transfer of the probe data 118 that exists within the network device log data 328 for one or more of the network devices 110 that are in the network map data 132 indicates that the egress network device is known. However, if the probe data 118 reaches the destination device 126 and the network device log data 328 does not show a transfer associated with the probe data 118, a failure may be determined. For example, the probe data 118 may have exited the first network 102 by way of an unknown egress network device 114 that is not providing network device log data 328 to the destination device 126. In another example, the failure may be indicative of a malfunction of a logging service on one or more of the network devices 110.

The analysis module 130 may combine one or more of the techniques described above. For example, combination of probe data 118, actual egress network address data 128, notification data 326, network device log data 328, and so forth, may be used to generate the report data 134.

In some implementations, one or more of the modules may be stored at least in part in the memory 318 of other computing devices 302, may be executed at least in part on the other computing devices 302, and so forth. For example, one destination device 126 may receive the probe data 118 while another computing device 302 executes the analysis module 130 and generates the report data 134.

Other modules 330 may also be present in the memory 318. For example, encryption modules may be used to encrypt and decrypt communications between computing devices 302, such as the notification data 326, network device log data 328, and so forth. Authentication modules may be used to authenticate communications sent or received by computing devices 302. Cryptographic modules may be used to perform encryption or decryption.

Other data 332 within the data store 322 may include information such as configurations and settings associated with computing devices 302 or modules thereof. For example, the other data 332 may include one or more threshold values. Threshold values may include maximum values, minimum values, ranges of values, and so forth.

In different implementations, different computing devices 302 may have different capabilities or capacities. For example, the source device 116 may have significantly more processor 306 capability and memory 318 capacity compared to the processor 306 capability and memory 318 capacity of network devices 110.

Illustrative Processes

Figure 4:
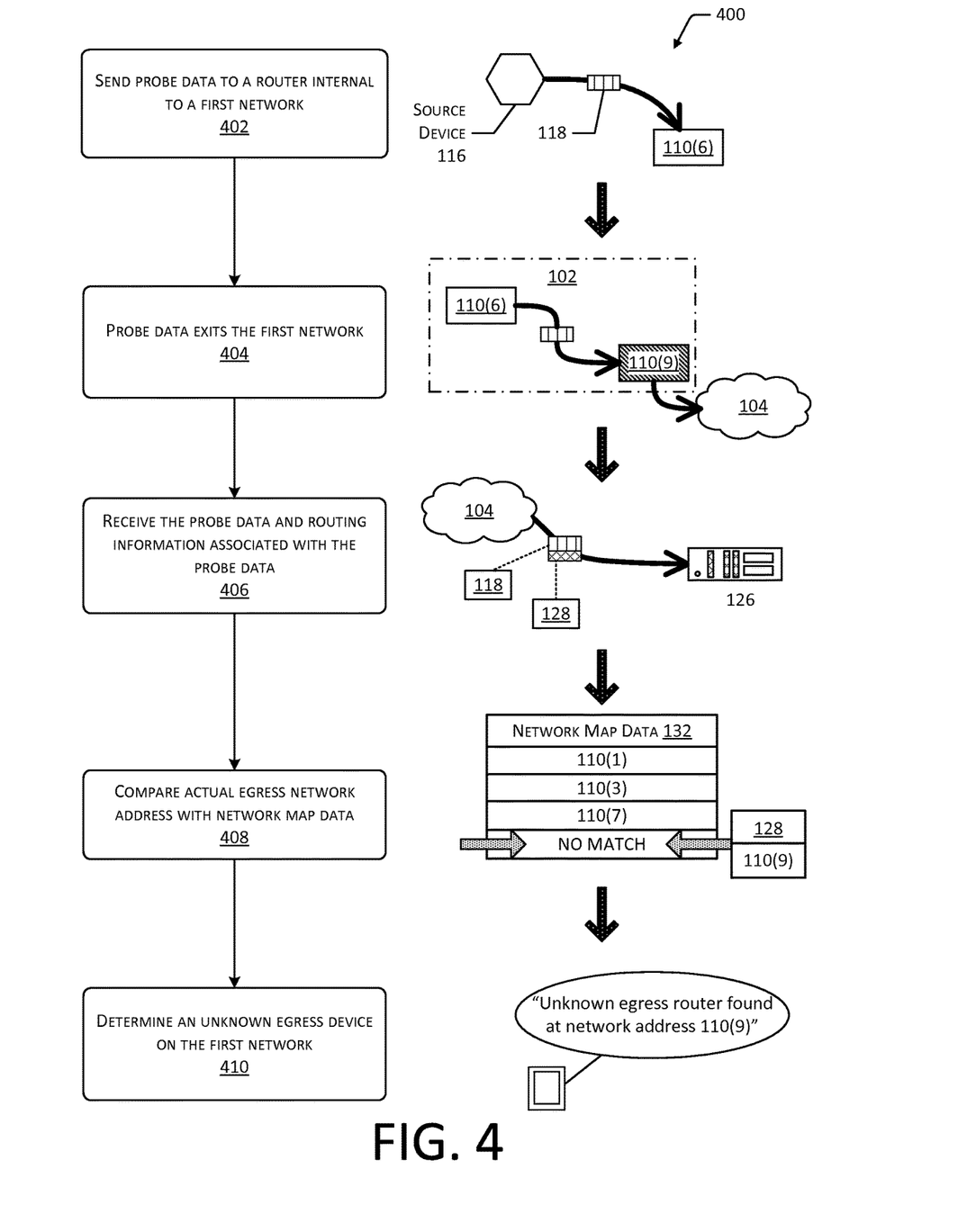
FIG. 4 illustrates a process in which egress network devices are determined using probe data, according to one implementation.

FIG. 4 illustrates a process 400 in which egress network devices are determined using probe data 118, according to one implementation. The process may be implemented at least in part by one or more of the source device 116, the destination device 126, or other devices.

At 402 probe data 118 is sent to a network device 110 internal to the first network 102. For example, the source device 116 may send probe data 118 having LSR data 122 from a first subnet 106(1) that specifies a network device 110(6) (such as a router) on the second subnet 106(2). The LSR data 122 specifies a route or path through the networks that different from that which would otherwise result from sending the probe data 118. The LSR data 122 may specify a route available at the time of transmission that is longer than is otherwise available. For example, unlike the use of LSR data 122 during a failover situation, such as to bypass an inoperative network device 110, here the LSR data 122 directs the probe data 118 to follow another a second route even though a first route which is shorter is otherwise available.

At 404 the probe data 118 is sent from the first network 102 to the second network 104. For example, the probe data 118 may exit the first network 102 by way of network device 110(9).

At 406 the probe data 118 is received and the routing information associated with the probe data 118, such as the actual egress network address 128. For example, one or more network devices 110 within the second network 104 may transfer the probe data 118 to the destination device 126.

At 408 the actual egress network address 128 is compared with the network map data 132. For example, the value of the actual egress network address 128 indicative of a network address of the network device 110(9) is not found within the network map data 132.

At 410 an unknown egress network device 114 is determined on the first network 102. Continuing the example, the analysis module 130 may designate the network device 110(9) which is absent from the network map data 132 as an unknown egress network device 114.

Figure 5:
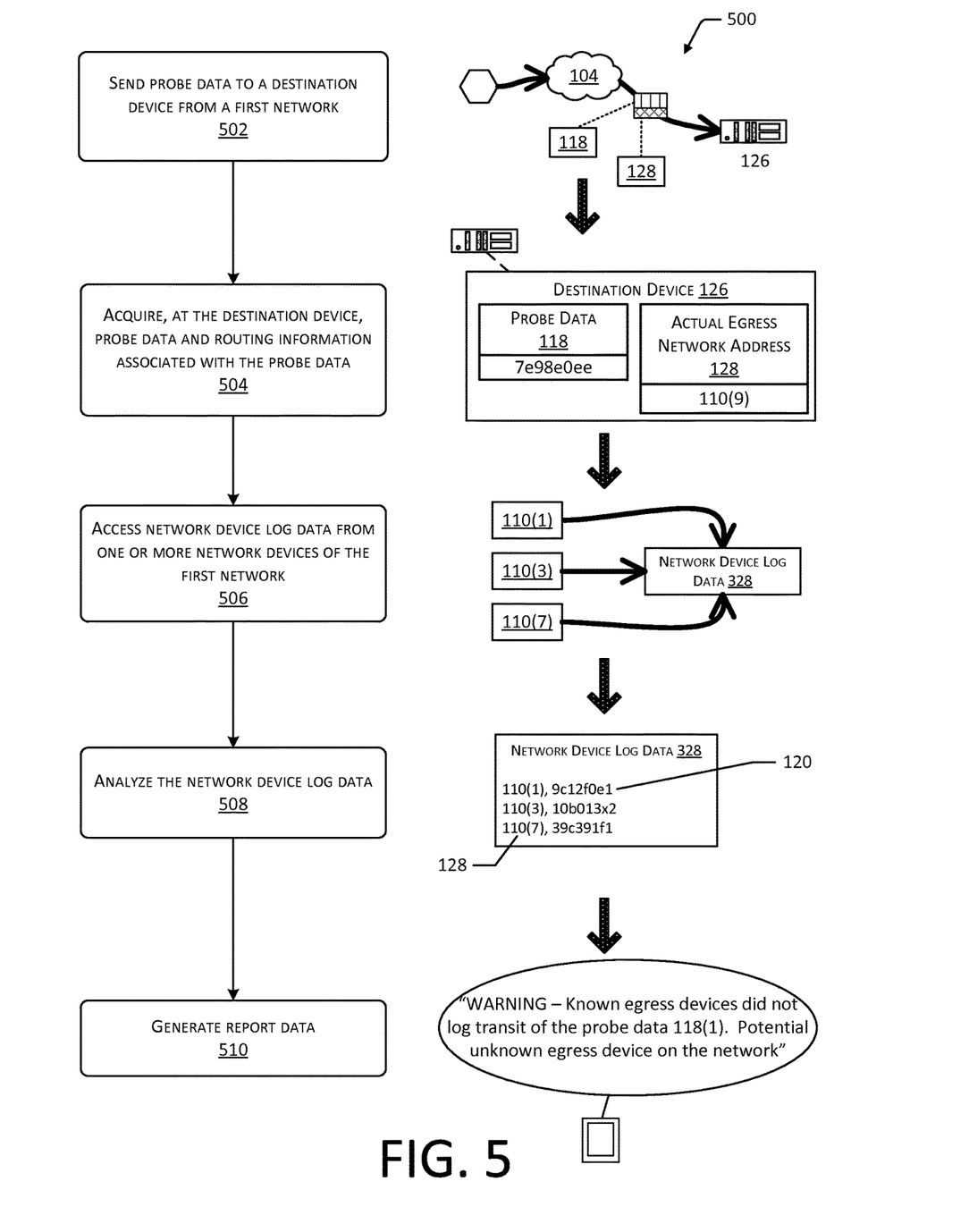
FIG. 5 illustrates a process in which egress network devices are determined using probe data and from network device log data obtained from egress network devices, according to one implementation.

FIG. 5 illustrates a process 500 in which egress network devices are determined using probe data 118 and network device log data 328 obtained from egress network devices, according to one implementation.

At 502 probe data 118 is sent to a destination device 126 from a first network 102. For example, the probe data 118 may include LSR data 122 that delivers the probe data 118 to the second subnet 106(2) of the first network 102. At the second subnet 106(2), a network device 110 routes the probe data 118 to the second network 104.

At 504 probe data 118 is acquired at the destination device 126 and routing information associated with the probe data 118. For example, the routing information associated with the probe data 118 may include the actual egress network address 128. In other implementations, the routing information associated with probe data 118 may include information indicative of the different network devices 110 involved in routing the probe data 118.

At 506 network device log data 328 is accessed. As described above, the network device log data 328 may be obtained from one or more of the network devices 110. In one implementation, the network device log data 328 may comprise information obtained from known egress network devices 112, such as those network devices 110 that connect to the second network 104. The network devices 110 may be configured to collect the network device log data 328. The network devices 110 may transfer the network device log data 328 to another device such as the destination device 126. For example, the network device 110 may send the network device log data 328 at predetermined intervals, when the network device log data 328 reaches a predetermined size, upon request (polling) by another device, and so forth.

At 508 the network device log data 328 is analyzed. For example, the analysis module 130 may search the network device log data 328 to determine if the ID data 120 associated with the probe data 118 is present within the network device log data 328.

At 510 report data 134 is generated. For example, the report data 134 may be generated based at least in part on the analysis by the analysis module 130 that indicates the ID data 120 for the probe data 118 is not present within the network device log data 328. The report data 134 may indicate that the known egress network devices 112 did not transfer the probe data 118, that the known egress network devices 112 may be experiencing a failure with respect to logging functionality, that the probe data 118 has somehow been modified or corrupted during transit, or a combination thereof.

In some implementations, the analysis module 130 may also access the notification data 326. For example, the notification data 326 may include data indicative of the ID data 120 originally sent in the probe data 118. The analysis module 130 may use information in the notification data 326 to determine that the ID data 120 included in the probe data 118 was corrupted.

Figure 6:
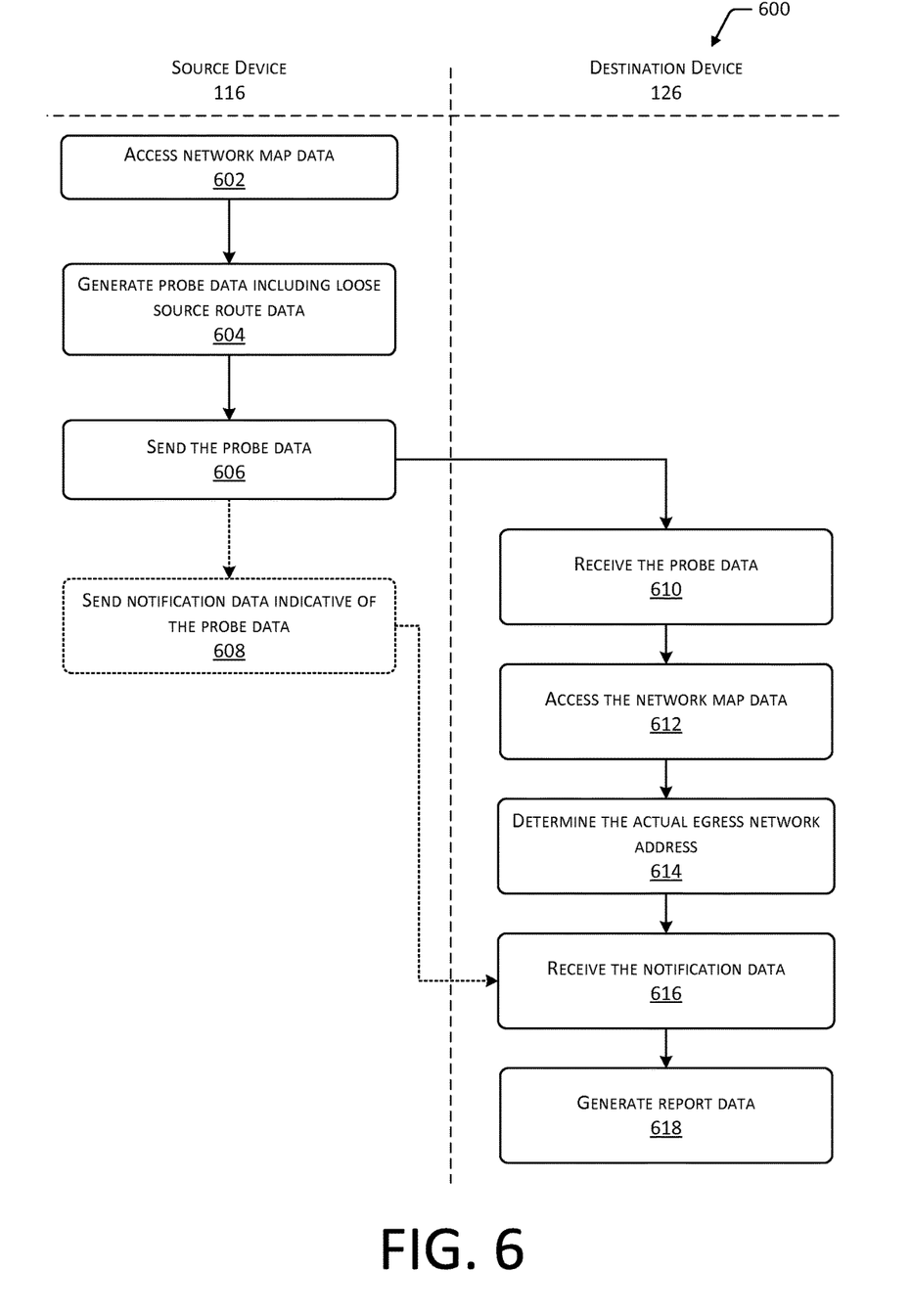
FIG. 6 is a flow diagram of a process for determining egress network devices of a network using probe data and loose source routing, according to one implementation.

FIG. 6 is a flow diagram 600 of a process for determining egress network devices of a network using probe data 118 and loose source routing, according to one implementation. The process may be implemented by one or more of the components described above with regard to the system 100.

At 602 a source device 116 accesses at least a portion of the network map data 132. The network map data 132 may be obtained from one or more of analysis of previously transmitted probe data 118, from manual input provided by a system administrator, from data obtained from automated network enumeration tools, from information acquired at least in part by one or more the network devices 110, and so forth. For example, the network map data 132 may be indicative of router network addresses on the first network 102, including the first subnet 106(1) and the second subnet 106(2).

At 604 the source device 116 generates probe data 118. As described above, the probe data 118 may include ID data 120 that identifies the probe data 118, LSR data 122 that designates an internal route from the first subnet 106(1) to a router having a network interface connected to the second subnet 106(2) within the first network 102, and destination network address data 124 indicative of a network address value on the second network 104. The route specified by the LSR data 122 may be longer or less than optimal compared to other routes to the destination device 126 that may be available at that time. For example, the LSR data 122 may result in the probe data 118 transiting a larger number of network devices 110 in reaching the destination device 126 than datagrams that are not constrained by the LSR data 122.

As described above, in some implementations, the probe data 118 may comprises a plurality of datagrams, each of the datagrams specifying a different network port number. The probe data 118 may be configured to use particular groups of network ports, such as open network ports, close network ports, and so forth.

At 606 the source device 116 sends the probe data 118. For example, the source device 116 may send the probe data 118 to a router on the same subnet 106 as the source device 116. The router may use the LSR data 122 to direct the probe data 118 to another router internal to the first network 102 but on a different subnet 106.

In some implementations, at 608 the source device 116 may send notification data 326 to the destination device 126. The route following by the notification data 326 to the destination device 126 may be different from that followed by the probe data 118. As described above, the notification data 326 may be indicative of the probe data 118. For example, the notification data 326 may indicate a value of the ID data 120 included in the probe data 118. In another example, the notification data 326 may include data indicative of transmittal of the probe data 118 to the destination network address of the destination device 126, such as a timestamp of transmission, communication session information, and so forth.

At 610 the destination device 126 receives the probe data 118. For example, a communication module 324 executing on the destination device 126 may accept a connection and the transfer of the probe data 118 and data associated with the transfer of the probe data 118, such as the actual egress network address 128.

At 612 the destination device 126 accesses at least a portion of the network map data 132.

At 614 the destination device 126 determines the actual egress network address 128, or other information associated with transit of the probe data 118. For example, the actual egress network address 128 may be extracted from a header of a datagram.

At 616 the destination device 126 receives the notification data 326. In some implementations, the notification data 326 may be obtained from another device. For example, a control server may send instructions to the source device 116, and these instructions may direct the source device 116 to generate probe data 118 with particular values. In one implementation, the control server may then send the notification data 326 to the destination device 126. In another implementation, the control server may receive information from the destination device 126 and may generate the report data 134.

At 618 the report data 134 is generated. For example, the analysis module 130 may determine based on a comparison between the actual egress network address 128 and the network map data 132 that an unknown egress network device 114 transferred the probe data 118 from the first network 102 to the second network 104.

Figure 7:
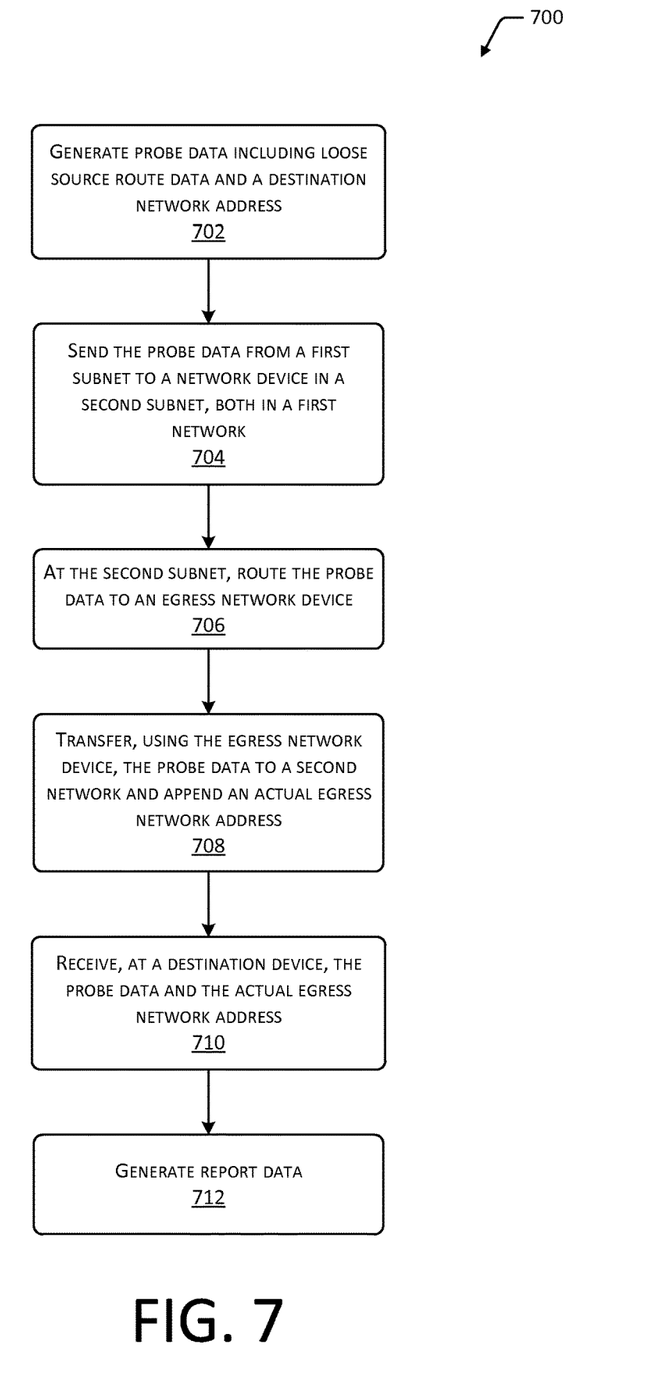
FIG. 7 is a flow diagram of a process of using probe data to determine egress network devices, according to one implementation.

FIG. 7 is a flow diagram 700 of a process of using probe data 118 to determine egress network devices 110, according to one implementation. The process may be implemented by one or more of the components described above with regard to the system 100.

At 702 probe data 118 is generated. For example, the probe data 118 may include LSR data 122 that designates a route from the first subnet 106(1) to a designated network device 110 connected to the second subnet 106(2) within the first network 102. The LSR data 122 may include a partial listing of routers that describes an incomplete path between the source device 116 and the destination device 126 indicated by the destination address data 124. The probe data 118 may also include a destination network address 124 that is associated with the destination device 126 located on the second network 104. In some implementations, the first subnet 106(1) and the second subnet 106(2) are connected using an encrypted VPN connection, which may send data using the second network 102.

At 704 the probe data 118 is sent to a network device 110 within the first network 102. For example, the probe data 118 may be sent to a router on the first subnet 106(1), that in turn routes to the second subnet 106(2) based on the LSR data 122. The LSR data 122 may specify a network device 110 that is connected to the second subnet 106(2). The second subnet 106(2) may be selected from a plurality of subnets 106(N) that are part of the first network 102, where "N" is a nonzero positive integer value. For example, a particular subnet 106 may be selected randomly.

The probe data 118 may be sent using one or more different ports. For example, known closed network port data indicative of a network port associated with a failure to transfer data may be accessed. In another example, known open port data indicative of a network port associated with successful transfer of data may be accessed. In some implementations, both the closed network port data and the open network port data may be used contemporaneously. The probe data 118 may then be sent using one or more of: the closed network ports or the open network ports.

The probe data 118 may be sent responsive to data indicative of a probe interval. For example, the probe interval may specify a random time value between a minimum time and a maximum time, a regular repeating interval, and so forth. In one implementation, a network device 110 may be configured to send the probe data 118 at the specified probe interval. In some implementations, the designated network device 110 may also generate the probe data 118.

At 706, at the second subnet 106(2), the probe data 118 is routed to an egress network device 110.

At 708, using the egress network device 110, the probe data 118 is transferred to the second network 104. Corresponding to the transfer, an actual egress network address 128 is appended or otherwise associated with probe data 118. For example, the source address field within the header of a probe data 118 datagram may be updated such that the source address indicates the address on the second network 104 of the router.

At 710, at the destination device 126, the probe data 118 and other information associated with the transfer of the probe data 118 is received, such as the actual egress network address 128.

At 712 the report data 134 is generated. For example, the analysis module 130 may use the probe data 118, the actual egress network address 128, the network map data 132, the notification data 326, and so forth, to generate the report data 134. The analysis module 130 may generate comparison data indicative of a comparison of the actual egress network address data 128 to the one or more known egress network addresses in the network map data 132. For example, the comparison data may indicate no matches, a count of matches, a number of close but not identical matches, and so forth.

Figure 8:
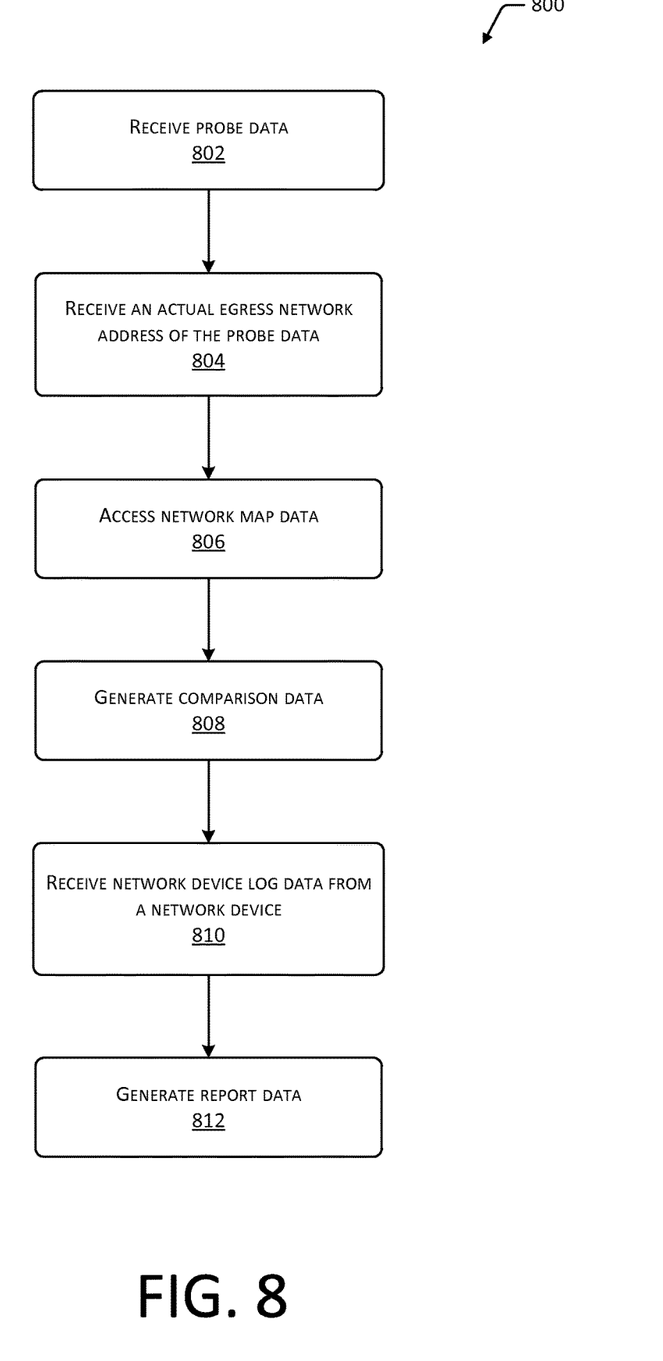
FIG. 8 is a flow diagram of a process for using probe data received at a destination device to determine report data about egress network devices, according to one implementation.

FIG. 8 is a flow diagram 800 of a process for using probe data 118 received at a destination device 126 to determine egress network devices 110, according to one implementation. The process may be implemented by one or more of the components described above with regard to the system 100.

At 802 probe data 118 is received. The probe data 118 may originate at a source device 116 on a first subnet 106(1) within a first network 102.

At 804 an actual egress network address 128 is received. The actual egress network address 128 may be indicative of a network address of a network interface of an egress network device 110 connected to the first network 102 that the probe data 118 was transferred to the second network 104 by.

At 806 network map data 132 is accessed. Network map data 132 may be indicative of one or more known egress network addresses associated with the first network 102.

At 808 comparison data is generated. The analysis module 130 may generate comparison data indicative of a comparison of the actual egress network address 128 to the known egress network addresses specified in the network map data 132. The comparison data may indicate identical matches, near matches, null matches, and so forth. For example, the analysis module 130 may determine, based on the comparison data, the actual egress network address 128 is not present in the network map data 132.

At 810 network device log data 328 is received from one or more of the network devices 110. As described above, the network device log data 328 may comprise information indicative of transfer of the probe data 118 from the first network 102 to the second network 104. The generation of the comparison data as described at 808 may be indicative of a comparison between the probe data 118 and the network device log data 328. For example, the comparison data may indicate that the ID data 120 is not present in the network device log data 328.

At 812 report data 134 is generated. Continuing the example above, based on the comparison data, the report data 134 may indicate an unknown egress network device 114 of the first network 102 is present, as found with the actual egress network address 128 and confirmed by the absence of the ID data 120 in the network device log data 326.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a source device comprising:
  one or more network interfaces connected to a first subnetwork of a first network;
  one or more memories storing computer-executable instructions; and
  one or more hardware processors configured to execute the computer-executable instructions to:
   access network map data indicative of router network addresses on the first network including the first subnetwork and a second subnetwork;
   generate probe data comprising:
    identification data,
    loose source route data designating an internal route from the first subnetwork to a router having a network interface connected to the second subnetwork within the first network, and
    a destination network address on a second network; and
   send the probe data to the destination network address in the second network via an egress router in the second subnetwork of the first network, the egress router having an egress network address, the egress router appending the egress network address to the probe data; and
 a destination device in the second network, the destination device having the destination network address and comprising:
  one or more network interfaces connected to the second network, wherein the second network is connected to the first network by the egress router;
  one or more memories storing computer-executable instructions; and
  one or more hardware processors configured to execute the computer-executable instructions to:
   receive the probe data combined with the egress network address from the egress router in the first network;
   access the network map data;
   determine the egress network address is not present in the network map data; and
   generate report data indicative of an unknown egress router of the first network having the egress network address.

2. The system of claim 1, the destination device further comprising computer-executable instructions to:
 receive notification data from a source device, the notification data comprising:
  the identification data indicative of the probe data, and
  data indicative of transmittal of the probe data to the destination network address; and
 determine the identification data included in the probe data corresponds to the identification data included in the notification data.

3. The system of claim 1, wherein the probe data comprises a plurality of datagrams, each of the plurality of datagrams specifying a different network port number.

4. A system comprising:
 a source device comprising:
  one or more network interfaces connected to a first subnetwork of a first network, wherein a second network is accessible from the first subnetwork via a first route;
  one or more memories storing computer-executable instructions; and
  one or more hardware processors configured to execute the computer-executable instructions to:
   generate probe data comprising:
    loose source route data designating a second route from the first subnetwork to a designated network device connected to a second subnetwork within the first network, wherein the second route includes a greater number of hops than the first route, and
    a destination network address on the second network; and
   send the probe data to the destination network address within the second network via an egress device in the second subnetwork of the first network using the second route, the egress device having an egress network address, the egress device appending the egress network address to the probe data; and
 a destination device having the destination network address in the second network, the destination device configured to:
  receive the probe data and the egress network address from the egress device of the first network;
  access data indicative of one or more known egress network addresses associated with the first network; and
  generate comparison data indicative of a comparison of the egress network address data to the one or more known egress network addresses.

5. The system of claim 4, wherein the designated network device connected to the second subnetwork is selected from a plurality of designated network devices on the second subnetwork.

6. The system of claim 4, the source device further comprising computer-executable instructions to:
 access known closed port data indicative of a network port associated with a failure to transfer data;
 access known open port data indicative of a network port associated with successful transfer of data; and
 wherein the probe data is sent using one or more of the closed network ports or the open network ports.

7. The system of claim 4, wherein the loose source route data includes a partial listing of routers that describes an incomplete path between the source device and a destination device indicated by the destination network address.

8. The system of claim 4, wherein the first subnetwork and the second subnetwork are connected using an encrypted virtual private network (VPN) connection that sends data using the second network.

9. The system of claim 4, wherein the destination device comprises:
one or more network interfaces connected to the second network;
one or more memories storing computer-executable instructions; and
one or more hardware processors configured to execute the computer-executable instructions to generate the comparison data.

10. The system of claim 9, wherein the probe data comprises a plurality of datagrams, each of the plurality of datagrams specifying a different network port number.

11. The system of claim 9, wherein the probe data includes a globally unique identifier generated using one or more of a random number generator or pseudorandom number generator.

12. The system of claim 9, wherein the probe data is transmitted as one or more of Secure Socket Layer (SSL) or Transport Layer Security (TLS) datagram.

13. The system of claim 4, wherein the source device comprises a router, and further comprising computer-executable instructions to:
access data indicative of a probe interval; and
wherein the probe data is sent by the designated network device at the probe interval.

14. The system of claim 4, wherein the probe data comprises a User Datagram Protocol (UDP) datagram.

15. A system comprising:
one or more memories storing computer-executable instructions; and
one or more hardware processors configured to execute the computer-executable instructions to:
receive from an egress network device probe data originating at a source device on a first subnetwork within a first network, the probe data comprising, as specified by the source device:
loose source route data designating an internal route from the first subnetwork to a designated network device having a network interface connected to a second subnetwork within the first network, and
a destination network address on a second network;
receive, from an egress network device, an egress network address indicative of a network address of the network interface of the egress network device within the first network, and further wherein the probe data was transferred to the second network by the egress network device;
access network map data indicative of one or more known egress network addresses associated with the first network; and
generate comparison data indicative of a comparison of the egress network address to the network map data.

16. The system of claim 15, further comprising computer-executable instructions to:
determine, based on the comparison data, the egress network address is not present in the network map data; and
generate report data indicative of an unknown egress network device of the first network having the egress network address.

17. The system of claim 15, wherein the probe data further comprises identification data indicative of one or more of a particular datagram or group of datagrams.

18. The system of claim 15, further comprising computer-executable instructions to:
receive network device log data from the egress network device, wherein the network device log data comprises information indicative of a transfer of the probe data from the first network to the second network; and
wherein the generation of the comparison data is further indicative of a comparison between the probe data and the network device log data.

19. The system of claim 15, wherein the probe data further comprises identification data indicative of the second subnetwork.

20. The system of claim 15, wherein the probe data is formatted to appear to one or more networking devices as an implementation of one or more of Secure Socket Layer (SSL) or Transport Layer Security (TLS).

* * * * *